(12) United States Patent
Lee (10) Patent No.: US 8,848,159 B2
(45) Date of Patent: Sep. 30, 2014

(54) METHOD OF FABRICATING LIQUID CRYSTAL DISPLAY DEVICE

(75) Inventor: Jae-Won Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/961,950

(22) Filed: Dec. 7, 2010

(65) Prior Publication Data

US 2011/0157538 A1 Jun. 30, 2011

(30) Foreign Application Priority Data

Dec. 24, 2009 (KR) .................. 10-2009-0131287

(51) Int. Cl.
G02F 1/1339 (2006.01)
G02F 1/1333 (2006.01)
G02F 1/137 (2006.01)

(52) U.S. Cl.
CPC .... *G02F 1/133351* (2013.01); *G02F 2202/023* (2013.01); *G02F 2001/13775* (2013.01); *G02F 1/1339* (2013.01); *G02F 2001/13793* (2013.01)
USPC ............................................. 349/190; 349/93

(58) Field of Classification Search
None
See application file for complete search history.

(56) References Cited

U.S. PATENT DOCUMENTS

| 7,169,449 | B2 | 1/2007 | Nakanishi | |
| 2003/0043326 | A1* | 3/2003 | Sawasaki et al. | 349/123 |
| 2004/0233374 | A1* | 11/2004 | Yamazaki et al. | 349/153 |
| 2005/0152146 | A1* | 7/2005 | Owen et al. | 362/294 |
| 2007/0211197 | A1* | 9/2007 | Tashiro et al. | 349/106 |
| 2009/0213285 | A1* | 8/2009 | Yun et al. | 349/33 |

FOREIGN PATENT DOCUMENTS

| CN | 1869779 A | | 11/2006 |
| JP | 2004-302040 A | | 10/2004 |
| JP | 2006030933 A | * | 2/2006 |
| JP | 2007-334039 A | | 12/2007 |
| JP | 2009-015129 | | 1/2009 |
| WO | 2011/040397 A1 | | 4/2011 |

OTHER PUBLICATIONS

Machine translation of JP2006-030933A; Shiobara et al., Feb. 2006.*
Notification of Reasons for Refusal from the Japanese Intellectual Property Office dated Nov. 29, 2012 in Japanese counterpart application No. 2010-276873.
The First Office Action from The State Intellectual Property Office of the People's Republic of China dated Nov. 28, 2012 in counterpart Chinese application No. 201010617417.4
Notification of Reasons for Refusal from the Japanese Patent Office dated Nov. 5, 2013 in counterpart Japanese application No. 2010-276873.

* cited by examiner

*Primary Examiner* — Wen-Ying P Chen
(74) *Attorney, Agent, or Firm* — Morgan, Lewis & Bockius LLP (57) ABSTRACT

A method of fabricating a liquid crystal display device includes: forming an array substrate and a color filter substrate; forming a seal pattern on one of the array substrate and the color filter substrate; forming a liquid crystal layer in the seal pattern and attaching the array substrate and the color filter substrate; curing the seal pattern with a first ultraviolet (UV) ray emitted from a light emitting diode (LED); and cutting the array substrate and the color filter substrate into unit cells.

13 Claims, 5 Drawing Sheets

*FIG. 5B*

METHOD OF FABRICATING LIQUID CRYSTAL DISPLAY DEVICE

This application claims the benefit of Korean Patent Application No. 10-2009-0131287, filed on Dec. 24, 2009, which is hereby incorporated by reference in its entirety.

BACKGROUND OF THE INVENTION

1. Field of the Invention

The present invention relates to a method of fabricating a liquid crystal display (LCD) device, and more particularly, to a method of curing a seal pattern for an LCD device.

2. Discussion of the Related Art

As information age progresses, flat panel display (FPD) devices having the characteristics of light weight, thin profile, and low power consumption have developed. Specifically, liquid crystal display (LCD) devices have been widely used for a notebook computer, a monitor and a television because of their superiority in resolution, color display and display quality.

In general, the LCD device includes a liquid crystal panel that has two substrates facing and spaced apart from each other and a liquid crystal layer between the two substrates. The LCD device further includes electrodes on the two substrates for providing an electric field between the two substrates. The electric field generated between the electrodes aligns liquid crystal molecules of the liquid crystal layer, thereby displaying an image by changing light transmittance.

The LCD device is fabricated through an array process for forming an array substrate and a color filter substrate, a cell process for forming a liquid crystal panel, and a module process for integrating the liquid crystal panel and a backlight unit. In the array process, an array layer and a color filter layer are formed on the array substrate and the color filter substrate, respectively, through repetition of a thin film deposition, a photolithography and an etching. In the cell process, the array substrate and the color filter substrate are attached using a seal pattern and the liquid crystal layer is formed between the array substrate and the color filter substrate to complete the liquid crystal panel. In the module process, a polarizing plate and a driving circuit are attached to the liquid crystal panel and the backlight unit is integrated with the liquid crystal panel to complete the LCD device.

In the cell process, the seal pattern provides a gap between the array substrate and the color filter substrate for injecting a liquid crystal material and prevents the leakage of the injected liquid crystal material. The seal pattern may be formed of a sealant including one of a heat-curable resin capable of being cured with a heat and a UV (ultraviolet)-curable resin capable of being cured with a UV ray. The UV-curable resin having a superior adhesion property in low temperature to the heat-curable resin has been widely used.

The UV-curable resin includes a photoinitiator, a monomer having a UV-curing agent and a glass fiber for keeping a cell gap. After the seal pattern is formed on one of the two substrates, the liquid crystal layer is formed between the two substrates and the seal pattern is cured with a UV ray from a mercury lamp or a metal halide lamp to form the seal pattern.

Recently, according to the request for a high response speed of the LCD device, a liquid crystal material for the high response speed has been developed. The liquid crystal material for the high response speed includes a photoinitiator and a monomer, and the photoinitiator of the liquid crystal material reacts to a UV ray so that the liquid crystal material can be stabilized. However, since the UV ray for curing the seal pattern has intensity greater than the UV ray for stabilizing the liquid crystal layer, the photoinitiator of the liquid crystal layer reacts to the UV ray when the UV ray is irradiated for curing the seal pattern. As a result, the liquid crystal layer is partially over-cured and deteriorated.

Although an additional mask is used for preventing irradiation of the UV ray for curing the seal pattern onto the liquid crystal layer having the photoinitiator, the additional mask does not completely block the UV ray onto the liquid crystal layer in a region adjacent to the seal pattern and the liquid crystal layer in the region adjacent to the seal pattern is deteriorated by the UV ray.

Figure 1A:
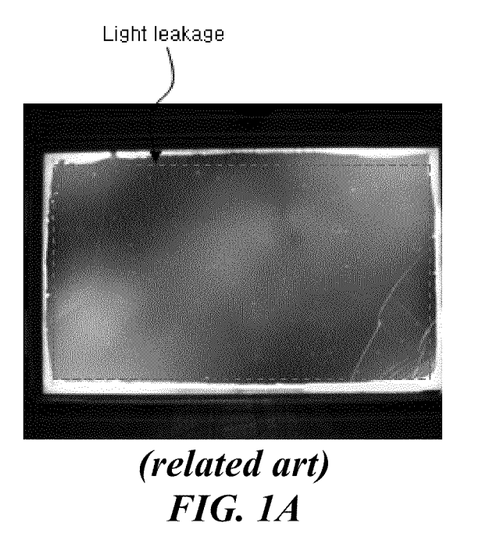
FIGS. 1A and 1B are views showing a light leakage and a stain, respectively, of an LCD device according to the related art.
Figure 1B:
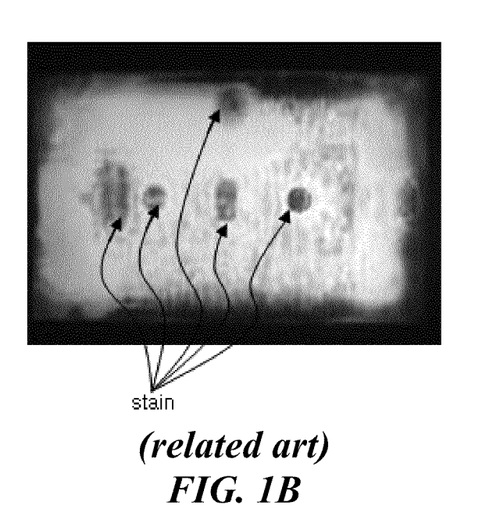

FIGS. 1A and 1B are views showing a light leakage and a stain, respectively, of an LCD device according to the related art. In FIG. 1A, the LCD device has a light leakage in a region adjacent to a seal pattern. Alternatively, in FIG. 1B, the LCD device has a stain corresponding to the UV curing apparatus. Accordingly, the display quality of the LCD device is reduced due to the light leakage and the stain. In addition, the fabrication cost of the LCD device increases due to the additional mask.

SUMMARY OF THE INVENTION

Accordingly, the present invention is directed to a method of fabricating a liquid crystal display device that substantially obviates one or more of the problems due to limitations and disadvantages of the related art.

An advantage of the present invention is to provide a method of fabricating a liquid crystal display device where deterioration of a liquid crystal layer due to a UV ray for curing a seal pattern is prevented.

Another advantage of the present invention is to provide a method of fabricating a liquid crystal display device where a light leakage and a stain are prevented and a fabrication cost is reduced.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device includes: forming an array substrate and a color filter substrate; forming a seal pattern on one of the array substrate and the color filter substrate; forming a liquid crystal layer in the seal pattern and attaching the array substrate and the color filter substrate; curing the seal pattern with a first ultraviolet (UV) ray emitted from a light emitting diode (LED); and cutting the array substrate and the color filter substrate into unit cells.

In another aspect, a method of fabricating a liquid crystal display device having first and second substrates, a liquid crystal layer between the first and second substrates and a seal pattern preventing a leakage of the liquid crystal layer and attaching the first and second substrates includes: curing the seal pattern with a ultraviolet (UV) ray in a curing apparatus that includes a stage having the first and second substrates thereon and at least one light emitting diode (LED) emitting the UV ray.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 2:
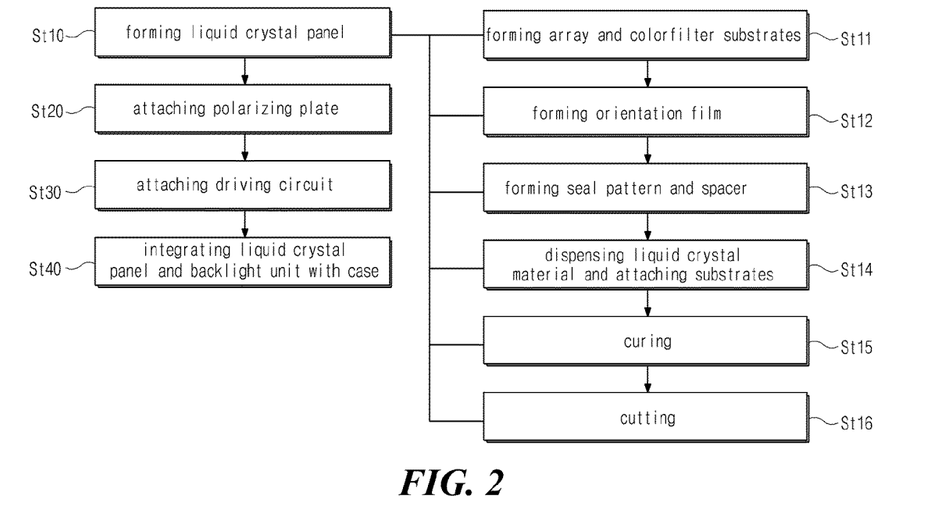
FIG. 2 is a view showing a method of fabricating an LCD device according to an embodiment of the present invention.

FIG. 2 is a view showing a method of fabricating an LCD device according to an embodiment of the present invention.

At step St10 of FIG. 2, a liquid crystal panel is formed through an array process and a cell process including steps St11 to St16. At step St11, an array substrate and a color filter substrate are formed and particles are removed by a cleaning process. A gate line, a data line crossing the gate line to define a pixel region, a thin film transistor (TFT) connected to the gate line and the data line and a pixel electrode connected to the TFT may be formed on the array substrate. In addition, a black matrix corresponding to the gate line, the data line and the TFT, a color filter layer including red, green and blue color filters on the black matrix and a common electrode on the color filter layer may be formed on the color filter substrate.

At step St12, an orientation film is formed on at least one of the array substrate and the color filter substrate. At step St13, a seal pattern for preventing leakage of a liquid crystal material is formed on one of the array substrate and the color filter substrate by printing a sealant and a spacer for obtaining a uniform cell gap is formed on one of the array substrate and the color filter substrate. The sealant may include a UV-curable resin capable of being cured with a UV ray. For example, the UV-curable resin may include a photoinitiator, a UV curing agent, a monomer, a binder and a glass fiber for keeping a cell gap. Specifically, the sealant does not react to the UV ray having a wavelength within a range of about 340 nm to about 365 nm.

At step St14, the liquid crystal material is dispensed onto one of the array substrate and the color filter substrate to form a liquid crystal layer in the seal pattern, and the array substrate and the color filter substrate are attached. For example, the step of dispensing the liquid crystal material and the step of attaching the array substrate and the color filter substrate may be simultaneously performed using a liquid crystal dispensing vacuum attachment apparatus. In the liquid crystal dispensing vacuum attachment apparatus, after the array substrate having the printed seal pattern thereon is disposed to face into the color filter substrate, the liquid crystal material is dispensed on one of the array substrate and the color filter substrate by a screen printing method or a dispenser printing method. Next, the array substrate and the color filter substrate are aligned to and attached to each other in a vacuum. The liquid crystal material may be one of a nematic liquid crystal material, a smectic liquid crystal material and a cholesteric liquid crystal material.

A blue phase mode liquid crystal material may be used for the liquid crystal layer to obtain a high response speed. The blue phase mode liquid crystal material may include a photoinitiator and a monomer. In addition, after the liquid crystal layer is formed, the blue phase mode liquid crystal material may be stabilized with a UV ray having a wavelength within a range of about 340 nm to about 365 nm and does not react to a UV ray having a wavelength other than the range of about 340 nm to about 365 nm.

At the step St15, the seal pattern between the array substrate and the color filter substrate is cured with a UV ray through one of the array substrate and the color filter substrate. The seal pattern may be cured using a curing apparatus that includes a light emitting diode (LED) emitting a UV ray having a wavelength other than a range of about 340 nm to about 365 nm. For example, the LED may emit a UV ray having at least one wavelength of about 385 nm, about 395 nm and 405 nm. In addition, the seal pattern may be cured with the UV ray having a wavelength other than a range of about 340 nm to about 365 nm. For example, the seal pattern may be cured with the UV ray having the at least one wavelength of about 385 nm, about 395 nm and 405 nm and does not react to a UV ray having a wavelength within a range of about 340 nm to about 365 nm. At step St16, the attached array substrate and the color filter substrate are cut into unit cells to complete the liquid crystal panel.

Next, at step St 20, polarizing plates are attached to outer surfaces of the liquid crystal panel. One of the polarizing plates polarizes a light from a backlight unit and the other of the polarizing plates analyzes the polarized light through the liquid crystal layer.

At step St 30, a driving circuit is attached to the liquid crystal panel. For example, the driving circuit may be attached to the liquid crystal panel through an outer lead bonding (OLB) process or a tape automated bonding (TAB) process. The driving circuit provides electric signals to the array substrate and the color filter substrate. For example, the driving circuit may include a gate driving circuit supplying a gate signal turning on or off the TFT on the array substrate to the gate line and a data driving circuit supplying a data signal corresponding to an image to the data line. In addition, the gate driving circuit and the data driving circuit may be attached to two adjacent sides of the liquid crystal panel. When the TFT is turned on according to the gate signal, the data signal is transmitted through the TFT to the pixel electrode. As a result, an electric field is generated between the pixel electrode and the common electrode, and the liquid crystal molecules in the liquid crystal layer are re-aligned according to the electric field, thereby displaying the image by changing light transmittance.

At step St40, the liquid crystal panel and the backlight unit are integrated in a case. The backlight unit may have an edge type including a lamp, a lamp guide, a light guide plate and a plurality of optical sheet. In another embodiment, the backlight unit may have a direct type without a light guide plate. The lamp may include one of cold cathode fluorescent lamp (CCFL), an external electrode fluorescent lamp (EEFL) and light emitting diode (LED) lamp. The case may include a top frame, a main frame and a bottom frame. The top frame may have a rectangular ring shape covering a top edge surface and a side surface of the liquid crystal panel and having an opening such that the image is displayed. The bottom frame may have a rectangular plate shape where the liquid crystal panel and the backlight unit are disposed. The edges of the bottom frame are upwardly bent. In addition, the main frame may surround the liquid crystal panel and the backlight unit and may be combined with the top and bottom frames to complete an LCD device.

In the method of fabricating the LCD device, since the step of dispensing the liquid crystal material and the step of attaching the array substrate and the color filter substrate are simultaneously performed using the liquid crystal dispensing vacuum attachment apparatus, the fabrication process for the liquid crystal panel is simplified and the fabrication time for the liquid crystal panel is reduced.

In addition, the liquid crystal layer is formed of the liquid crystal material that is stabilized with the UV ray having a wavelength within a range of about 340 nm to about 365 nm and does not react to the UV ray having a wavelength other than the range of about 340 nm to about 365 nm, and the seal pattern is formed of the sealant that is cured with the UV ray having a wavelength other than a range of about 340 nm to about 365 nm and does not react to the UV ray having a wavelength of about 340 nm to about 365 nm. For example, the seal pattern may be cured in a curing apparatus that includes an LED emitting a UV ray of at least one wavelength of about 385 nm, about 395 nm and 405 nm. Accordingly, deterioration of the liquid crystal layer by the UV ray having a wavelength other than the range of about 340 nm to about 365 nm is prevented while the seal pattern is cured with the UV ray having a wavelength other than the range of about 340 nm.

The liquid crystal material for a high response speed may include a monomer, a photoinitiator and a binder of polymer (high molecular compound). The monomer is polymerized by a light and includes a compound having a carbon-carbon unsaturated bond and a carbon-carbon cyclic bond. For example, the monomer may include acrylic compound such as 1,3-butyleneglycoldiacrylate, 1,4-butanedioldiacrylate and ethyleneglycoldiacrylate.

The photoinitiator is an initiator for photo polymerization and includes at least one acetophenone compound. For example, the photoinitiator may include one of diethoxyacetophenone, 2-methyl-2-monopolyno-1-(4-methylthiophenyl)propane-1-one and 2-hydroxy-2-methyl-1-phenylpropane-1-one. Alternatively, the photoinitiator includes one of benzoin compound, benzophenone compound, thioxanthone compound and triazine compound. For example, the benzoin compound may include benzoin, benzoinmethylether and benzoinethylether and the benzophenone compound may include benzophenone, benzoylbenzoic acid and benzoylbenzoic acid methylester. In addition, the thioxanthone compound may include 2-isopropylthioxanthone, 4-isopropylthioxanthone and 2,4-diethylthioxanthone, and the triazine compound may include 2,4-trichloromethyl-(piperonyl)-6-triazine and 2,4-bis(trichloromethyl)-6-(4-methoxynaphthyl)-1,3,5-triazine.

The binder may include acrylic copolymer including a first monomer having a carboxyl group and a second monomer copolymerized with the first monomer. For example, the first monomer may include unsaturated carboxylic acid such as acrylic acid, methacrylic acid and crotonic acid. In addition, the second monomer may include a styrene, a-methylstyrene and o-vinyltoluene.

The liquid crystal layer is stabilized by the UV ray having a wavelength within a range of about 340 nm to about 365 nm and does not react to the UV ray having a wavelength other than a range of about 340 nm to about 365 nm. In addition, the seal pattern is cured by the UV ray having a wavelength other than a range of about 340 nm to about 365 nm and does not react to the UV ray having a wavelength within a range of about 340 nm to about 365 nm. In addition, the seal pattern is cured in a curing apparatus that includes an LED emitting a UV ray having a wavelength other than a range of about 340 nm to about 365 nm. Accordingly, the liquid crystal layer does not react to the UV ray for curing the seal pattern even when the UV ray for curing the seal pattern is irradiated onto the liquid crystal layer, and deterioration of the liquid crystal layer is prevented. In addition, since the mask for blocking the UV ray for curing the seal pattern can be omitted, the fabrication efficiency is improved and the fabrication cost is reduced.

Moreover, the LED emitting the UV ray has advantages as compared with the mercury lamp or the metal halide lamp. First, the lifetime of the LED is longer than the lifetime of the mercury lamp or the metal halide lamp. For example, the LED has a lifetime of about 15000 HR to about 20000 HR, while the mercury lamp or the metal halide lamp has a lifetime of about 1500 HR to about 2000 HR. Second the generated heat and the power consumption of the LED are smaller than those of the mercury lamp or the metal halide lamp. Third, a quartz window having a relatively high price is not required for the LED, while the quartz window is necessary to the mercury lamp or the metal halide lamp. Accordingly, the fabrication efficiency is further improved and the fabrication cost is further reduced by curing the seal pattern with the UV ray from the LED. Further, the LED may be used for curing the seal pattern of an LCD device having a liquid crystal layer without a photoinitiator.

Figure 3:
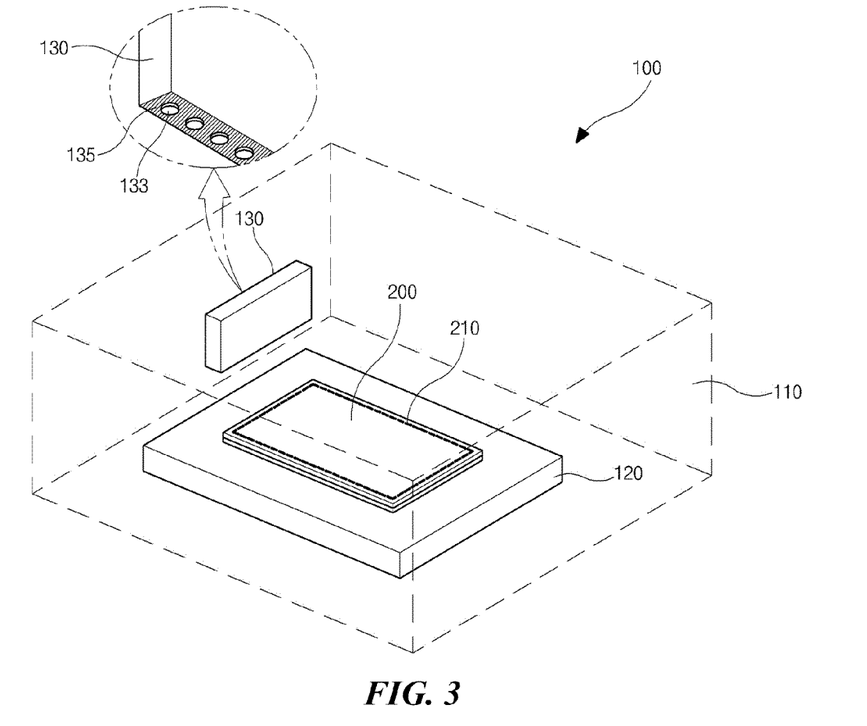
FIG. 3 is a curing apparatus for an LCD device according to an embodiment of the present invention.

FIG. 3 is a curing apparatus for an LCD device according to an embodiment of the present invention.

In FIG. 3, the curing apparatus 100 includes a chamber 110, a stage 120 having a liquid crystal panel 200 thereon and a light emitting diode (LED) unit 130 providing a UV ray. The stage 120 includes a plurality of holes 123 (of FIGS. 4A to 4D), and a plurality of lift pins 125 (of FIGS. 4A to 4D) are inserted into the plurality of holes 123, respectively, for moving up and down the liquid crystal panel 200.

When the liquid crystal panel 200 is inputted into the curing apparatus 100 by a transfer robot (not shown), the plurality of lift pins 125 are disposed at the highest position and the liquid crystal panel 200 is transferred from the transfer robot to the plurality of lift pins 125. Next, the plurality of lift pins 125 move down to the lowest position and the liquid crystal panel 200 is loaded on the stage 120. When the liquid crystal panel 200 is outputted from the curing apparatus 100 by the transfer robot, the plurality of lift pins 125 move up to the highest position and the liquid crystal panel 200 is lifted up by the plurality of lift pins 125. Next, the liquid crystal panel 200 is transferred from the plurality of lift pins 125 to the transfer robot.

For the purpose of preventing a static electricity and scattering and reflection of the UV ray, a top surface of the stage 120 may be anodized or may be coated with fluorine to have a black oxide film.

The LED unit 130 is disposed over the stage 120 and may have a bar shape having a length corresponding to a side of the state 120. Since a plurality of LEDs 133 are formed on a bottom surface of the LED unit 130 in one line, the LED unit 130 provides a UV ray from the plurality of LEDs 133 to stage 120. The plurality of LEDs 133 are spaced apart from each other and a reflecting plate 135 is formed in the bottom surface between the adjacent LEDs 133 to reflect the UV ray toward the liquid crystal panel 200. The plurality of LEDs 133 emit a UV ray having a wavelength other than a range of about 340 nm to about 365 nm. For example, the plurality of LEDs 133 may emit the UV ray having the at least one wavelength of about 385 nm, about 395 nm and 405 nm. In addition, the luminance uniformity of the plurality of LEDs 133 may be improved by controlling the brightness of the plurality of LEDs 133.

The curing apparatus 100 may further include a linear motor (not shown) for moving the LED unit 130 along a direction perpendicular to the length of the bar shape so that the seal pattern 210 can be cured by scanning of the UV ray from the LED unit 130. Alternatively, the LED unit may have the bottom surface corresponding to the liquid crystal panel 200 so that the whole seal pattern 210 can be simultaneously cured by the UV ray from the LED unit 130.

Further, the curing apparatus 100 may further include a temperature sensor (not shown) in the chamber 110 for preventing over-heating of the chamber 110 due to the plurality of LEDs 133.

FIGS. 4A to 4D are cross-sectional views showing a method of curing a seal pattern for an LCD device according to an embodiment of the present invention.

Figure 4A:
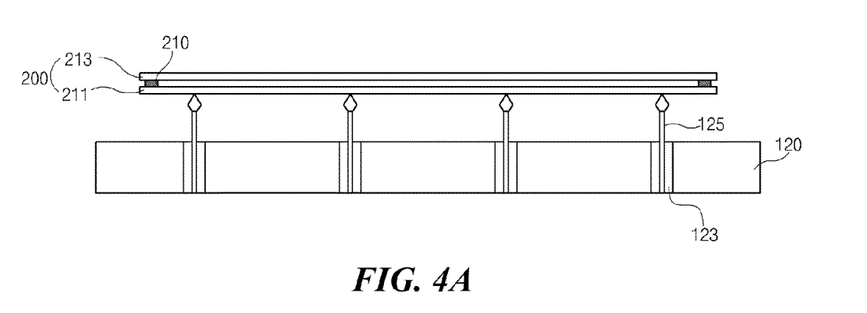
FIGS. 4A to 4D are cross-sectional views showing a method of curing a seal pattern for an LCD device according to an embodiment of the present invention.

In FIG. 4A, the plurality of lift pins 125 move up through the plurality of holes 123 in the stage 120 to protrude from the top surface of the stage 120 to the highest position. Next, the liquid crystal panel 200 is transferred from the transfer robot to the plurality of lift pins 125. The liquid crystal panel 200 includes an array substrate 211 and a color filter substrate 213 attached to each other using the seal pattern 210 and a liquid crystal layer (not shown) between the array substrate 211 and the color filter substrate 213. Although not shown in FIG. 4A, the array substrate may have a gate line, a data line, a thin film transistor (TFT) and a pixel electrode and a color filter substrate thereon, and the color filter substrate 213 may have a black matrix, a color filter layer and a common electrode. The seal pattern 210 may be cured with a UV ray having a wavelength other than a range of about 340 nm to about 365 nm and may not react to a UV ray having a wavelength within a range of about 340 nm to about 365 nm.

Figure 4B:
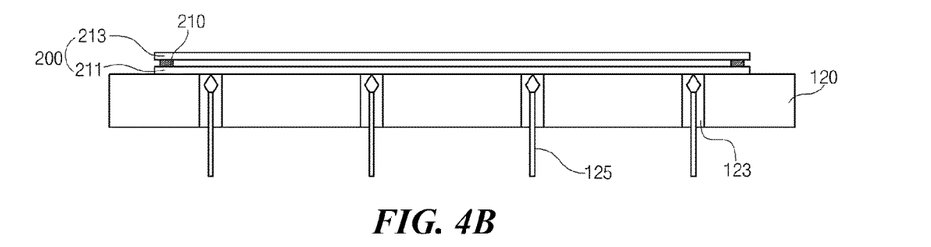

In FIG. 4B, the plurality lift pins 125 having the liquid crystal panel 200 thereon move down and the liquid crystal panel 200 is loaded on the stage 120.

Figure 4C:
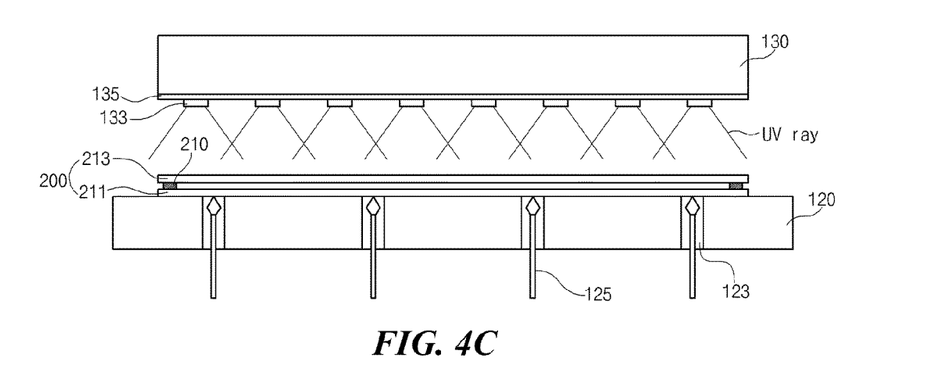

In FIG. 4C, the LED unit 130 having a bar shape is disposed over the liquid crystal panel 200. The plurality of LEDs 133 on the bottom surface of the LED unit 130 emit a UV ray having a wavelength other than a range of about 340 nm to about 365 nm. For example, the plurality of LEDs 133 may emit a UV ray of at least one wavelength of about 385 nm, about 395 nm and 405 nm. While the plurality of LEDs 133 emit the UV ray, the LED unit 130 may scan the whole area of the liquid crystal panel 200 so that the seal pattern 210 can be cured with the UV ray from the LED unit 130.

Figure 4D:
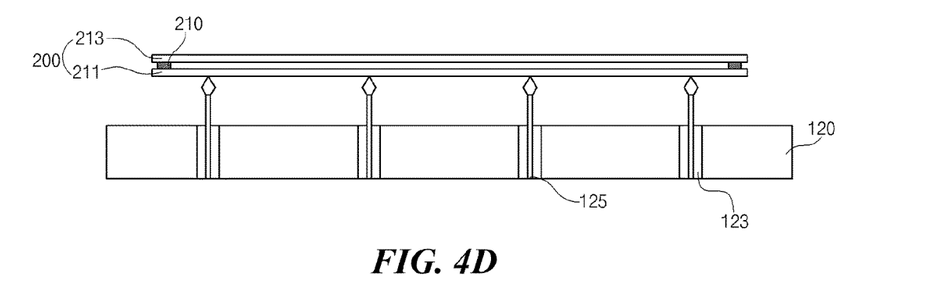

In FIG. 4D, after the seal pattern 210 is cured, the plurality of lift pins 125 move up to lift up the liquid crystal panel 200. Next, the liquid crystal panel 200 is outputted from the curing apparatus 100 by the transfer robot, thereby the curing process completed.

Figure 5A:
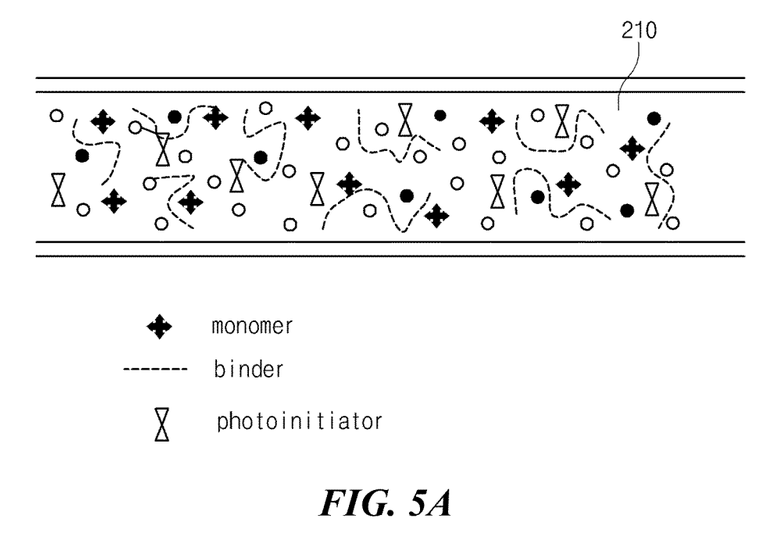
FIGS. 5A and 5B are views showing seal patterns before a curing step and after a curing step, respectively, for an LCD device according to an embodiment of the present invention.
Figure 5B:
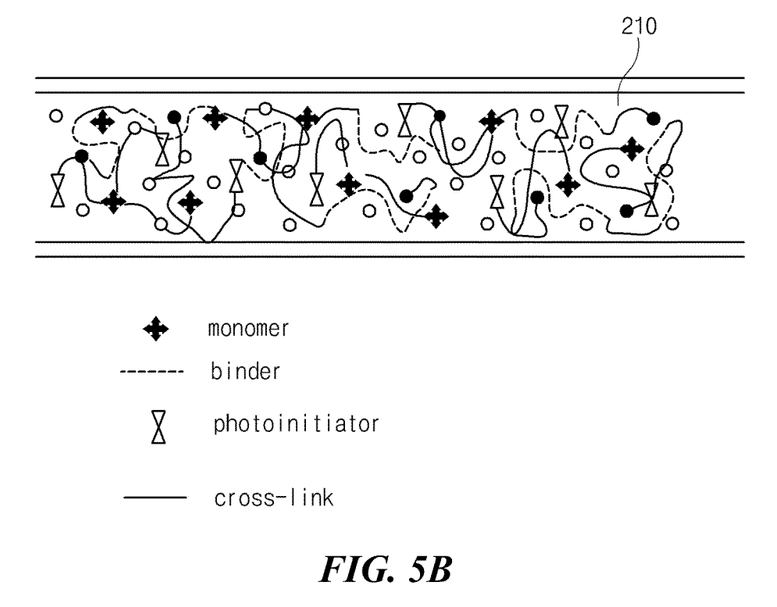

FIGS. 5A and 5B are views showing seal patterns before a curing step and after a curing step, respectively, for an LCD device according to an embodiment of the present invention.

In FIG. 5A, the seal pattern 210 of a UV-curable resin is formed on one of the array substrate and the color filter substrate by a screen printing method or a dispenser printing method. Although the seal pattern 210 includes monomers and binders, monomers are not linked to each other.

In FIG. 5B, the UV ray is irradiated on the seal pattern 210 and the monomers in the seal pattern 210 are linked to each other through the binder, thereby generating cross-links. As a result, the seal pattern 210 is cured to be stabilized.

In the present invention, consequently, a liquid crystal layer is formed of a liquid crystal layer that is stabilized with a UV ray having a wavelength within a rage of about 340 nm to about 365 nm and does not react to a UV ray having a wavelength other than a range of about 340 nm to about 365 nm. In addition, a seal pattern is formed of a sealant that is cured with the UV ray having a wavelength other than a range of about 340 nm to about 365 nm and does not react to the UV ray having a wavelength within a rage of about 340 nm to about 365 nm. Moreover, the seal pattern is cured in a curing apparatus having a plurality of LEDs emitting the UV ray having a wavelength other than a range of about 340 nm to about 365 nm. Since the liquid crystal layer does not react to the UV ray for curing the seal pattern, deterioration of the liquid crystal layer due to the UV ray for curing the seal pattern is prevented even when the UV ray for curing the seal pattern is irradiated onto the liquid crystal layer while the seal pattern is cured.

In addition, since the plurality of LEDs have advantages in lifetime, generated heat and power consumption as compared with a mercury lamp or a metal halide lamp, the fabrication efficiency is improved and the fabrication cost is reduced. Moreover, since an additional quartz window of high price is not required to the plurality of LEDs, the fabrication cost is reduced. Further, since the plurality of LEDs may be used for curing the seal pattern of an LCD device having a liquid crystal layer without a photoinitiator, the fabrication efficiency is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:

forming an array substrate and a color filter substrate;

forming a seal pattern on one of the array substrate and the color filter substrate;

forming a liquid crystal layer in the seal pattern and attaching the array substrate and the color filter substrate;

curing the seal pattern with a first ultraviolet (UV) ray emitted from a plurality of light emitting diodes (LEDs), wherein the plurality of LEDs are spaced apart from each other in one line and a reflecting plate is formed between the adjacent LEDs, wherein the reflecting plate has a wholly flat surface, and wherein the plurality of LEDs protrude above the wholly flat surface of the reflecting plate;

stabilizing the liquid crystal layer with a second UV ray having a wavelength different from the first UV ray; and cutting the array substrate and the color filter substrate into unit cells, wherein the seal pattern does not react to the second UV ray even when the second UV ray is irradiated onto the seal pattern and the liquid crystal layer does not react to a UV ray other than the second UV ray.

2. The method according to claim 1, wherein the first UV ray has a wavelength other than a range of about 340 nm to about 365 nm.

3. The method according to claim 2, wherein the first UV ray has at least one wavelength of about 385 nm, about 395 nm and 405 nm.

4. The method according to claim 1, wherein the second UV ray has a wavelength within a range of about 340 nm to about 365 nm.

5. The method according to claim 1, wherein the seal pattern is formed of a UV-curable resin including a photoinitiator, a UV curing agent, a monomer, a binder and a glass fiber.

6. The method according to claim 1, wherein the liquid crystal layer includes one of a nematic liquid crystal material, a smectic liquid crystal material, a cholesteric liquid crystal material and a blue phase mode liquid crystal material.

7. The method according to claim 6, wherein the blue phase mode liquid crystal material includes a photoinitiator and a monomer.

8. The method according to claim 1, wherein the array substrate has a gate line, a data line crossing the gate line to define a pixel region, a thin film transistor connected to the gate line and the data line and a pixel electrode connected to the thin film transistor thereon and the color filter substrate has a black matrix corresponding to the gate line, the data line and the thin film transistor, a color filter layer on the black matrix and a common electrode on the color filter layer thereon.

9. A method of fabricating a liquid crystal display device having first and second substrates, a liquid crystal layer between the first and second substrates and a seal pattern preventing a leakage of the liquid crystal layer and attaching the first and second substrates, comprises:
curing the seal pattern with a first ultraviolet (UV) ray in a curing apparatus that includes a stage having the first and second substrates thereon and at least one light emitting diode (LED) emitting the first UV ray; and
stabilizing the liquid crystal layer with a second UV ray having a wavelength different from the first UV ray,
wherein the at least one LED has a plurality of LEDs spaced apart from each other in one line and a reflecting plate is formed between the adjacent LEDs,
wherein the reflecting plate has a wholly flat surface,
wherein the at least one LED protrudes above the wholly flat surface, and
wherein the seal pattern does not react to the second UV ray even when the second UV ray is irradiated onto the seal pattern and the liquid crystal layer does not react to a UV ray other than the second UV ray.

10. The method according to claim 9, wherein the first UV ray having a wavelength other than a range of about 340 nm to about 365 nm.

11. The method according to claim 9, wherein the seal pattern includes a photoinitiator, a UV curing agent, a monomer, a binder and a glass fiber.

12. A method of fabricating a liquid crystal display device having first and second substrates, a liquid crystal layer between the first and second substrates and a seal pattern preventing a leakage of the liquid crystal layer and attaching the first and second substrates, comprises:
curing the seal pattern with a ultraviolet (UV) ray in a curing apparatus that includes a stage having the first and second substrates thereon and at least one light emitting diode (LED) emitting the UV ray,
wherein the stage includes a plurality of holes and a plurality of lift pins are inserted into the plurality of holes, respectively, for moving up and down the first and second substrates.

13. The method according to claim 12, wherein one of an anodizing treatment and a fluorine coating treatment is performed to the stage.

* * * * *